United States Patent
Nishide et al.

(10) Patent No.: US 7,082,181 B2
(45) Date of Patent: Jul. 25, 2006

(54) IMAGE RECONSTRUCTION METHOD AND X-RAY CT SYSTEM

(75) Inventors: Akihiko Nishide, Tokyo (JP); Tetsuya Horiuchi, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 11/124,946

(22) Filed: May 9, 2005

(65) Prior Publication Data
US 2005/0254617 A1 Nov. 17, 2005

(30) Foreign Application Priority Data
May 12, 2004 (JP) ............................... 2004-141795

(51) Int. Cl.
*A61B 6/00* (2006.01)
(52) U.S. Cl. ............................ 378/4; 378/19; 378/901
(58) Field of Classification Search .................. 378/4, 378/19, 62, 901; 700/182; 600/425; 382/131, 382/154, 132
See application file for complete search history.

(56) References Cited

U.S. PATENT DOCUMENTS

| | | | |
|---|---|---|---|
| 6,125,193 A | 9/2000 | Han et al. | |
| 6,553,356 B1 | 4/2003 | Good et al. | |
| 6,707,878 B1 | 3/2004 | Claus et al. | |
| 6,724,856 B1 | 4/2004 | De Man et al. | |
| 6,748,044 B1 | 6/2004 | Sabol et al. | |
| 2003/0035507 A1 | 2/2003 | Hsu et al. | |
| 2003/0095697 A1 | 5/2003 | Wood et al. | |
| 2004/0052328 A1 | 3/2004 | Sabol et al. | |
| 2004/0252870 A1* | 12/2004 | Reeves et al. | 382/128 |
| 2005/0002550 A1* | 1/2005 | Jabri et al. | 382/131 |
| 2005/0031075 A1 | 2/2005 | Hopkins et al. | |
| 2005/0113960 A1* | 5/2005 | Karau et al. | 700/182 |

FOREIGN PATENT DOCUMENTS

| | | |
|---|---|---|
| JP | 2004-070562 | 3/2004 |
| WO | WO2004/017263 | 2/2004 |

OTHER PUBLICATIONS

European Search Report, Reference 163991/10650, European Patent Application No. 05252910.4, PCT, 3 pgs.

* cited by examiner

*Primary Examiner*—Edward J. Glick
*Assistant Examiner*—Irakli Kiknadze
(74) *Attorney, Agent, or Firm*—Carl B. Horton, Esq.; Armstrong Teasdale LLP (57) ABSTRACT

A method for reconstructing an image that can be recognized stably during CAD. The method for reconstructing an image on the basis of a plurality of views of projection data items provided by X-rays having passed through a subject includes image reconstruction dedicated to a computer-aided detection (CAD) mode. The image reconstruction comprises a reconstruction function dedicated to the CAD mode, includes pre-processing that includes a noise removal filter for removing a noise from projection data, such as, a streaky artifact removal dedicated to the CAD mode, and also includes post-processing that includes a noise removal filter dedicated to the CAD mode.

12 Claims, 11 Drawing Sheets

IMAGE RECONSTRUCTION METHOD AND X-RAY CT SYSTEM

CROSS REFERENCE TO RELATED APPLICATIONS

This application claims the benefit of Japanese Application No. 2004-141795 filed May 12, 2004.

BACKGROUND OF THE INVENTION

The present invention relates to an image reconstruction method and an X-ray computed tomography (CT) system. More particularly, the present invention relates to a method of reconstructing an image on the basis of a plurality of views of projection data items provided by X-rays having passed through a subject, and an X-ray CT system performing the image reconstruction.

X-ray CT systems acquire a plurality of views of projection data items from a subject, and reconstruct an image on the basis of the projection data items. For the image reconstruction, processes such as pre-processing, reconstruction, and post-processing devised on the assumption of visual assessment of an image are employed. Therefore, even when computer-aided detection (CAD) is performed based on a reconstructed image, an image reconstructed on the assumption of the visual assessment is employed (refer to, for example, Patent Document 1).

[Patent Document 1] Japanese Unexamined Patent Application Publication No. 2004-070562 (pp. 4–5, FIG. 1)

In general, images for use in visual assessment have a high-frequency component thereof enhanced so that an image will appeal to naked eyes. Algorithms adapted to CAD include an algorithm that employs a differential filter. There is therefore a possibility that the differential filter function defined for CAD and a reconstruction function defined for visual assessment may enhance a noise to make recognition of an image, which is performed during CAD, unstable, and degrade a lesion image detection rate.

SUMMARY OF THE INVENTION

Therefore, an object of the present invention is to provide a method of reconstructing an image that will be recognized stably during CAD, and an X-ray CT system performing the image reconstruction.

(1) According to one aspect of the present invention for accomplishing the above object, there is provided a method of reconstructing an image on the basis of a plurality of views of projection data items provided by X-rays having passed through a subject. Herein, the method employs image reconstruction dedicated to a computer-aided detection (CAD) mode.

(2) According to another aspect of the present invention for solving the aforesaid object, there is provided an X-ray CT system comprising: an X-ray generation means; an X-ray detection means opposed to the X-ray generation means with a subject between them; and an image reconstruction means for reconstructing a tomographic image of the subject on the basis of a plurality of views of projection data items acquired via the X-ray detection means. The image reconstruction means performs image reconstruction dedicated to a computer-aided detection (CAD) mode.

Preferably, the image reconstruction comprises a reconstruction function dedicated to the computer-sided detection (CAD) mode so that a reconstructed image suitable for CAD can be produced.

Preferably, the image reconstruction comprises preprocessing that includes noise removal for removing a noise from projection data, such as, streaky artifact removal dedicated to the computer-aided detection (CAD) mode. Herein, a streaky artifact and other artifacts in a tomographic image can be effectively removed in order to improve image quality. This results in a reconstructed image suitable for CAD.

Preferably, the image reconstruction comprises post-processing that includes a noise removal filter dedicated to the computer-aided detection (CAD) so that a noise can be effectively removed in order to produce a reconstructed image suitable for CAD.

Preferably, the image reconstruction comprises a user interface dedicated to the computer-aided detection (CAD) mode so that image reconstruction dedicated to the CAD mode can be achieved properly.

Preferably, the user interface permits selection of a reconstruction function dedicated to the CAD mode so that the reconstruction function dedicated to the CAD mode can be selected properly.

Preferably, the user interface permits selection of preprocessing that includes noise removal for removing a noise from projection data, such as, streaky artifact removal dedicated to a computer-aided detection (CAD) mode.

Preferably, the user interface permits the post-processing that includes a noise removal filter dedicated to a computer-aided detection (CAD) mode so that the post-processing dedicated to the CAD mode can be selected properly.

According to the aforesaid aspects of the present invention, since image reconstruction dedicated to the CAD mode is included, a method of reconstructing an image that can be recognized stably during CAD, and an X-ray CT system performing the image reconstruction can be implemented.

Further objects and advantages of the present invention will be apparent from the following description of the preferred embodiments of the invention as illustrated in the accompanying drawings.

DETAILED DESCRIPTION OF THE INVENTION

Figure 1:
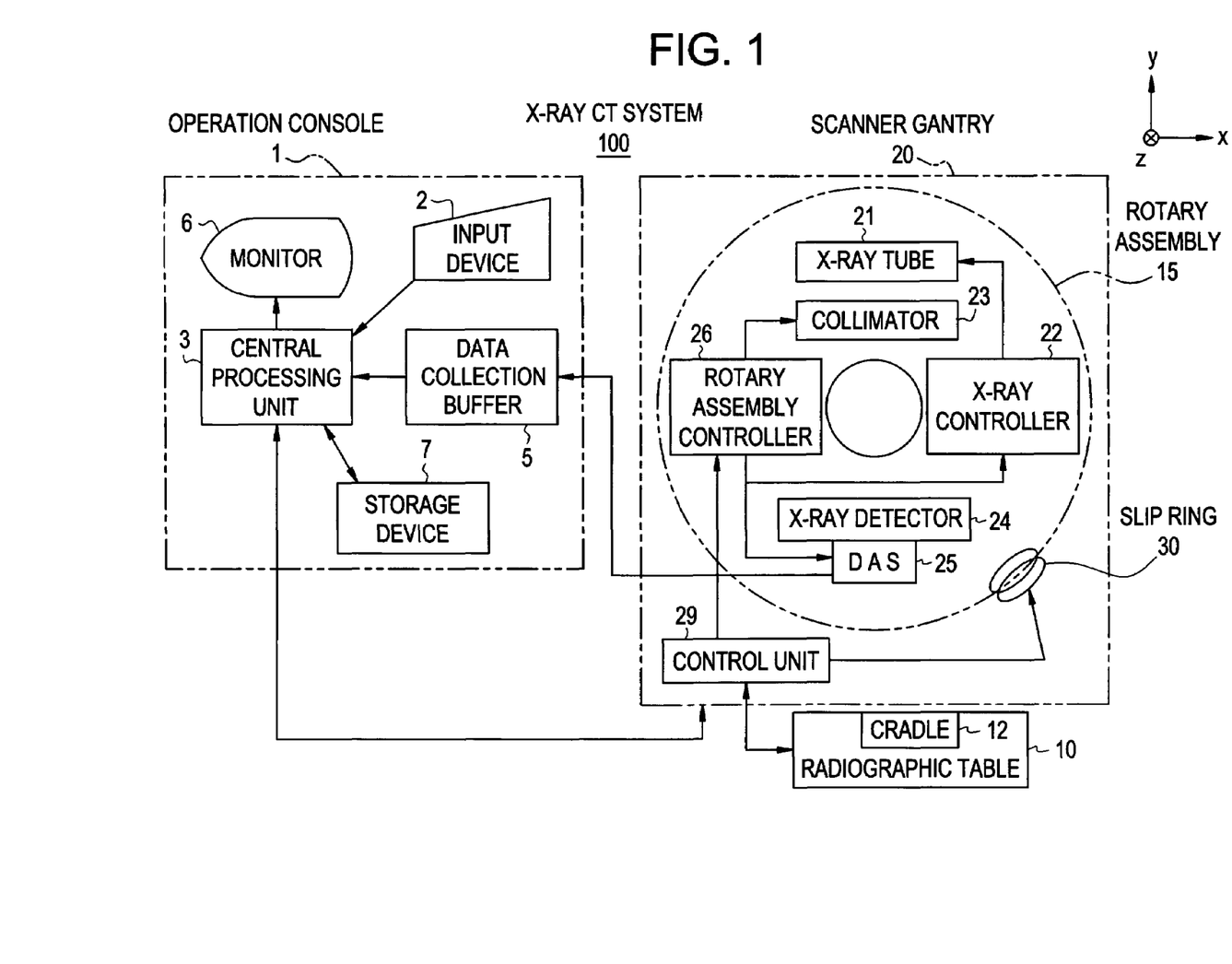
FIG. 1 is a block diagram of an X-ray CT system in accordance with the best mode for implementing the present invention.

The best mode for implementing the present invention will be described below with reference to drawings. Noted is that the present invention will not be limited to the best mode for implementing the present invention. FIG. 1 is a block diagram of an X-ray CT system. The X-ray CT system is an example of the best mode for implementing the present invention. The configuration of the X-ray CT system presents an example of the best mode for implementing the present invention in an X-ray CT system. Actions to be performed in the X-ray CT system present an example of the best mode for implementing the present invention in an image reconstruction method.

As shown in FIG. 1, an X-ray CT system 100 comprises an operator console 1, a radiographic table 10, and a scanner gantry 20. The operator console 1 comprises: an input device 2 that receives an operator's entry; a central processing unit 3 that executes image reconstruction or the like; a data collection buffer 5 in which projection data acquired by the scanner gantry 20 is collected; a monitor 6 on which a CT image reconstructed based on projection data is displayed; and a storage device 7 in which programs, data, reconstructed images are stored. The central processing unit 3 is an example of an image reconstruction means employed in the present invention. The input device 2 and monitor 6 constitute an example of an interface included in the present invention.

The radiographic table 10 includes a cradle 12 that is carried in or out of a bore of the scanner gantry 20 with a subject laid down thereon. The cradle 12 is raised or lowered, or moved rectilinearly by a motor incorporated in the radiographic table 10.

The scanner gantry 20 comprises: an X-ray tube 21, an X-ray controller 22; a collimator 23; an X-ray detector 24; a data acquisition system (DAS) 25; a rotary assembly controller 26 for rotating the X-ray tube 21 and others about the body axis of a subject; and a control unit 29 for transferring control signals or the like to or from the operator console 1 or radiographic table 10, and a slipring 30. The X-ray tube 21 is an example of an X-ray generation means included in the present invention. The X-ray detector 24 is an example of an X-ray detection means included in the present invention.

The configuration of the X-ray CT system has been outlined so far. In the thus-configured X-ray CT system, projection data is acquired, for example, as described below.

To begin with, a subject is carried into the bore of a rotary assembly 15 included in the scanner gantry 20. The position of the subject in a z-axis (body-axis) direction is fixed, and an X-ray beam radiated from the X-ray tube 21 is irradiated to the subject (projection of X-rays). The X-ray detector 24 detects transmitted X-rays. The detection of transmitted X-rays is performed in the directions of N views (where N equals, for example, 1000) while the X-ray tube 21 and X-ray detector 24 are being rotated about the subject (that is, while a projection angle (view angle) is being varied). Thus, data acquisition is performed over 360°.

The data acquisition system (DAS) 25 analog-to-digital converts transmitted X-rays that are detected, and then transfers projection data to the operator console 1 via the data collection buffer 5. This sequence of actions shall be referred to as one scan.

A scan position is shifted by a predetermined length in the z-axis direction, and the next scan is performed. This scanning technique is called a conventional scanning (or axial scanning) technique. In contrast, a technique in which while the radiographic table 10 is being moved at a predetermined speed synchronously with a change in a projection angle and the scan position is being shifted (while the X-ray tube 21 and X-ray detector 24 are helically rotating about a subject), projection data is acquired is the so-called helical scanning technique. The present invention can be adapted to both the conventional scanning and helical scanning techniques.

When the scanner gantry 20 is tilted with respect to the z axis, tilt scanning is achieved. The tilt scanning can be combined with either of the conventional scanning and helical scanning techniques.

The operator console 1 stores projection data, which is transferred from the scanner gantry 20, in a fixed disk HDD that is part of the storage device 7 connected to the central processing unit 3. For example, the projection data is convoluted to a predetermined reconstruction function, and then subjected to back projection in order to reconstruct a tomographic image. Herein, in the operator console 1, a tomographic image can be reconstructed in real time using projection data sequentially transferred from the scanner gantry 20 during scanning, and the latest tomographic image is displayed on the monitor 6 all the time. Furthermore, projection data may be read from the fixed disk or hard disk in order to reconstruct an image.

Image reconstruction and CAD will be described below. Normally, detection of a lesion image included in CAD employs processing relatively susceptible to a noise, such as, contour tracking or local change sampling. In contrast, image reconstruction included in X-ray CT generally employs a reconstruction function, which enhances a harmonic frequency component, because the image reconstruction is applied on the assumption of visual assessment of an image. The reconstruction function is adjusted in line with human vision.

However, CAD based on automatic image recognition sensitively reacts to a delicate change in a density or a spatial change occurring in units of a pixel, but is insensitive to a local and moderate change. If image reconstruction dedicated to CAD is available, CAD would be more effectively performed.

According to the present embodiment, as long as CT numbers fall below a threshold for use in delineating the lung field and a threshold for use in sampling an intrapulmonary region image, a low-frequency component is reflected on reconstruction of an image in order to remove a noise, which occurs during binary-coding, from the delineation. When CT numbers falls within the other range, a high-frequency component may be reflected on image reconstruction.

Consequently, a noise in an image occurring during detection of a candidate for a lesion image within CAD is suppressed and a detection rate of CAD is improved. In order to accomplish this object, a reconstruction function is devised so that it will interact with a differential filter included for CAD but will not excessively enhance a noise.

According to the present embodiment, as long as CT numbers fall below a threshold for use in delineating the lung field or a threshold for use in sampling an intrapulmonary region image, a reconstruction function defined to enhance a low-frequency component more greatly than the one defined for visual assessment is used for image reconstruction in order to remove a noise in a delineation occurring during binary-coding. When the CT numbers fall within the other range, a high-frequency component is reflected on image reconstruction.

Figure 2:
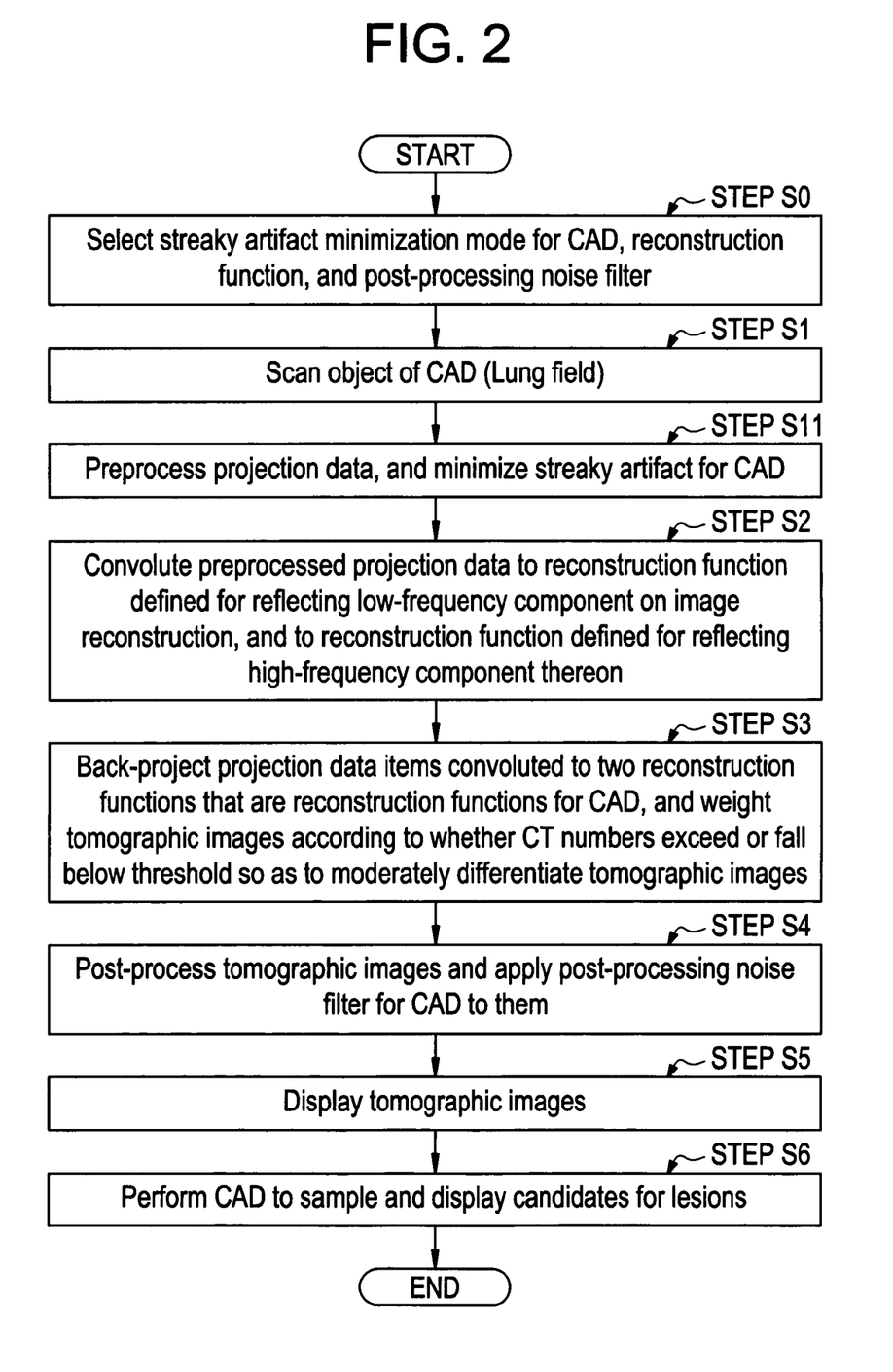
FIG. 2 is an explanatory diagram describing the flow of processing performed in an embodiment of the present invention.

The contents of processing to be performed in the operator console 1 included in the present embodiment will be described with reference to the explanatory diagram of FIG. 2. FIG. 2 is the explanatory diagram describing the flow of processing to be performed in the operator console 1 included in the present embodiment.

At step S0, a CAD streaky artifact minimization mode, a reconstruction function, and a post-processing noise filter are selected. The section is achieved by an operator (user). The section is achieved by utilizing user interfaces shown in FIG. 3. The user interfaces are displayed on the monitor 6, and the operator uses the input device 2 for selection.

Figure 3:
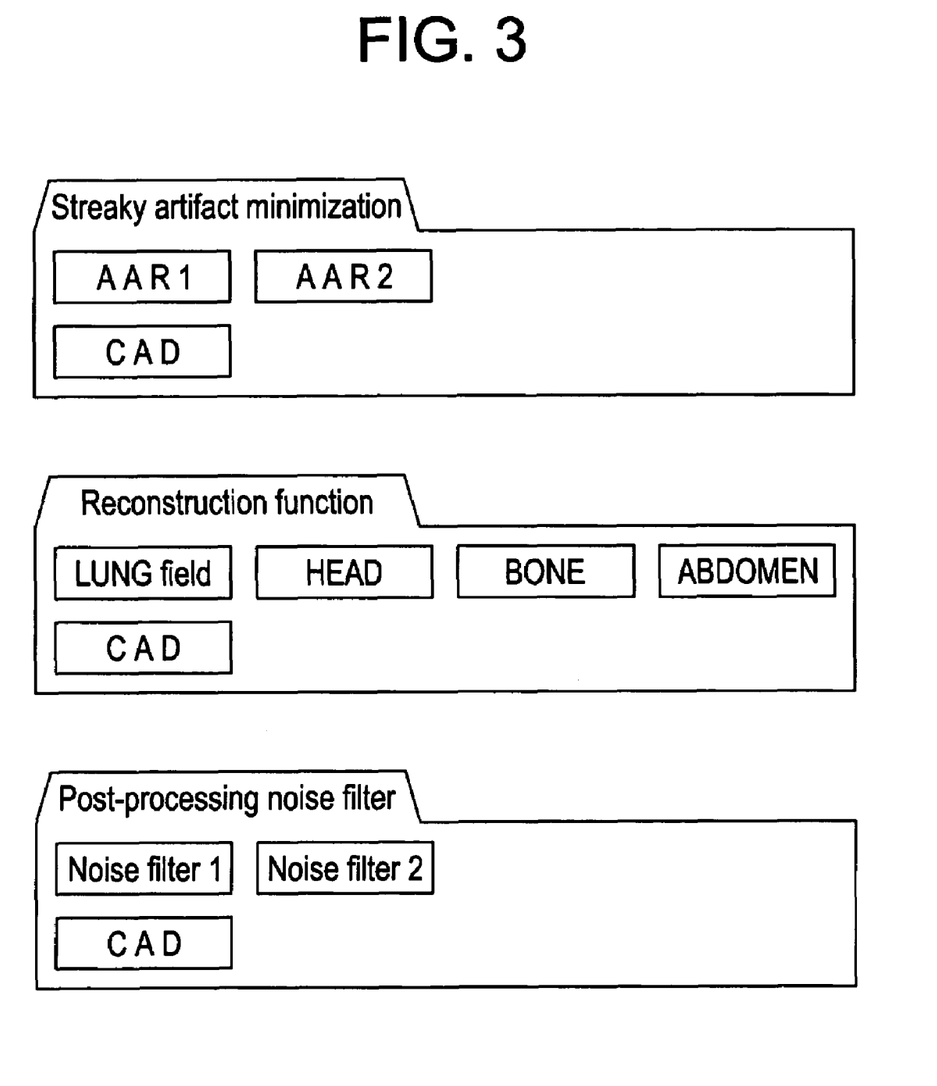
FIG. 3 shows user interfaces employed in the embodiment of the present invention.

The user interface concerning the streaky artifact minimization mode presents three items AAR1, AAR2, and CAD. The items AAR1 and AAR2 permit selection of menus concerning visual image assessment. The item CAD permits selection of a menu concerning CAD. The CAD menu specifies streaky artifact minimization that is more effective than that specified in the visual image assessment menus AAR1 and AAR2. Herein, the item CAD is selected.

The user interface concerning a reconstruction function presents five items Lung Field, Head, Bone, Abdomen, and CAD. The items Lung Field to Abdomen permit selection of menus concerning visual image assessment. The item CAD permits selection of a menu concerning CAD. The CAD menu specifies low-frequency enhancement that is more effective than that specified in the visual image assessment menus AAR1 and AAR2. Herein, the item CAD is selected.

The user interface concerning a post-processing noise filter presents three items Noise Filter 1, Noise Filter 2, and CAD. The items Noise Filter 1 and Noise Filter 2 permit selection of menus concerning visual image assessment. The item CAD permits selection of a menu concerning CAD. The CAD menu specifies noise removal that is more effective than that specified in the visual image assessment menus Noise Filter 1 and Noise Filter 2. Herein, the item CAD is selected.

At step S1, a region that is an object of CAD is scanned. For example, according to the present embodiment, the lung field is scanned.

At step S1, projection data is pre-processed. Namely, CAD streaky artifact minimization is executed. The pre-processing is performed according to the contents of the CAD menu selected at step S0.

At step S2, the pre-processed projection data is convoluted to a reconstruction function defined for reflecting a low-frequency component on image reconstruction and to a reconstruction function defined for reflecting a high-frequency component thereon. The convolution is performed according to the contents of the CAD menu selected at step S0.

At step S3, the projection data items resulting from the convolutions to the two reconstruction functions are back-projected, and the resultant tomographic images are weighted according to whether CT numbers exceed or fall below a threshold, and thus moderately differentiated from each other. Consequently, the tomographic images are produced using the reconstruction functions for CAD.

At step S4, the tomographic images are post-processed, that is, a CAD noise filter is applied to them. The post-processing is achieved according to the contents of the CAD menu selected at step S0.

Figure 4:
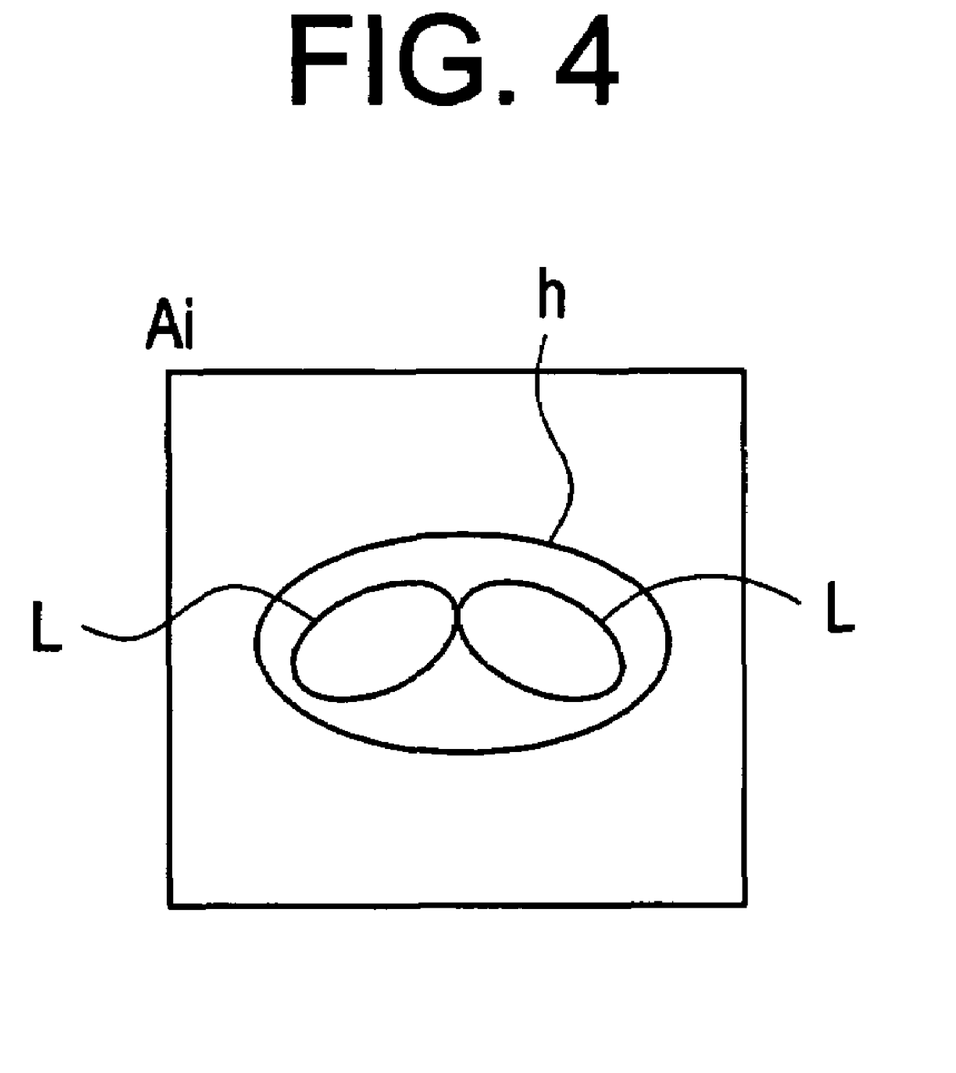
FIG. 4 shows an example of a tomographic image.

At step S5, the tomographic images are displayed. Namely, the image of the lung field like the one shown in FIG. 4 is displayed.

At step S6, CAD is performed in order to sample and display a candidate for a lesion image.

Figure 5:
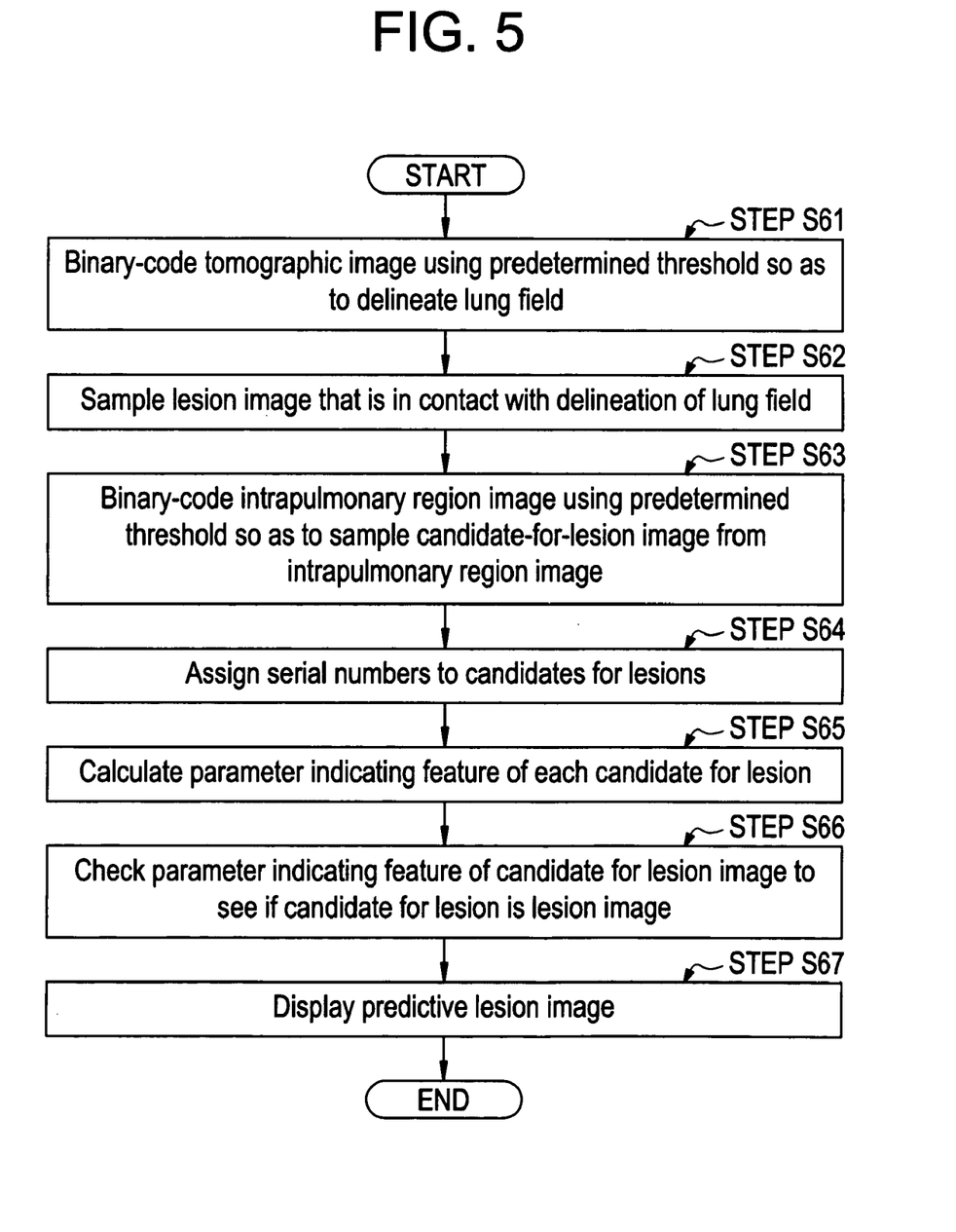
FIG. 5 is an explanatory diagram describing processing included in CAD and performed in the embodiment of the present invention.

FIG. 5 describes the flow of processing, which is part of CAD, for sampling and displaying a candidate for a lesion image.

Figure 6:
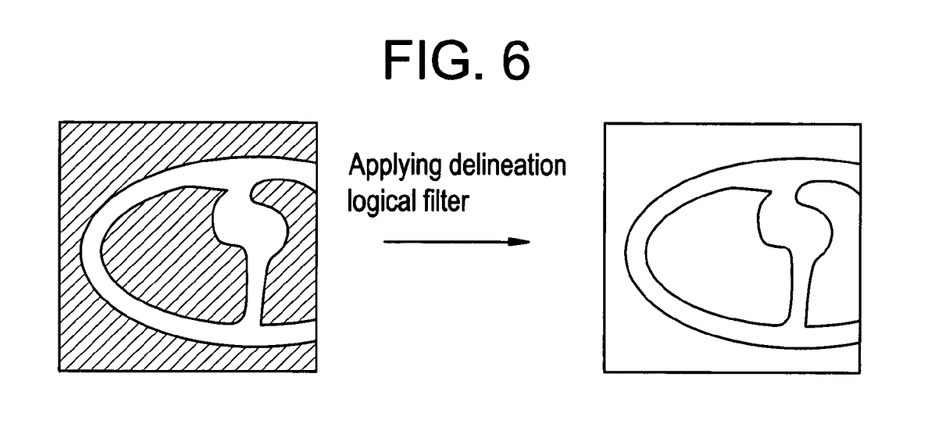
FIG. 6 is an explanatory diagram concerning delineation of the lung field performed in the embodiment of the present invention.

At step S61, a tomographic image is binary-coded based on a predetermined threshold in order to delineate the lung field. Namely, as shown in FIG. 6, a logical filter for delineating the lung field is used to delineate the lung field.

Figure 7:
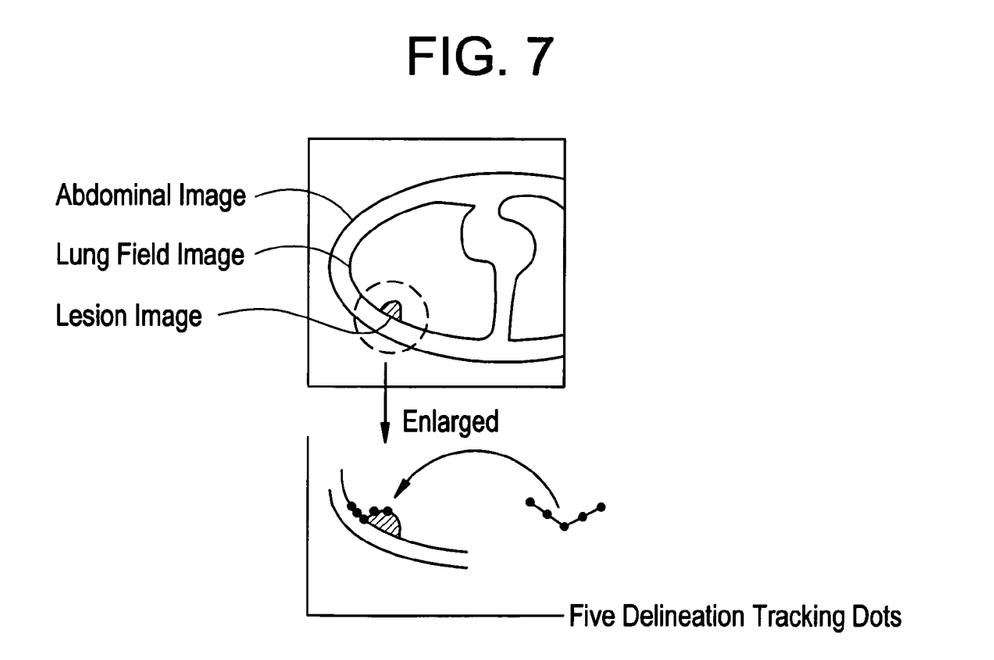
FIG. 7 is an explanatory diagram concerning sampling of a lesion image in contact with the delineation of the lung field which is performed in the embodiment of the present invention.

Step S62, a lesion image located on the delineation of the lung field is sampled from the tomographic image of the lung field. Namely, as shown in FIG. 7, for example, five delineation tracking dots having a space, which corresponds to a pixel, between adjoining ones are moved along the delineation of the lung field. The positional relationships among the five dots are checked to see if a candidate for a lesion image is present.

At step S63, an intrapulmonary region image contained in the tomographic image of the lung field is binary-coded based on a predetermined threshold in order to sample a candidate-for-lesion image within the intrapulmonary region image.

At step S64, serial numbers are assigned to respective candidates for a lesion.

At step S65, a parameter indicating a feature of each candidate for a lesion image is calculated.

At step S66, the parameter indicating a feature of each candidate for a lesion image is checked to see if the candidate is a lesion image.

At step S67, the presumable lesion image is displayed.

Figure 8:
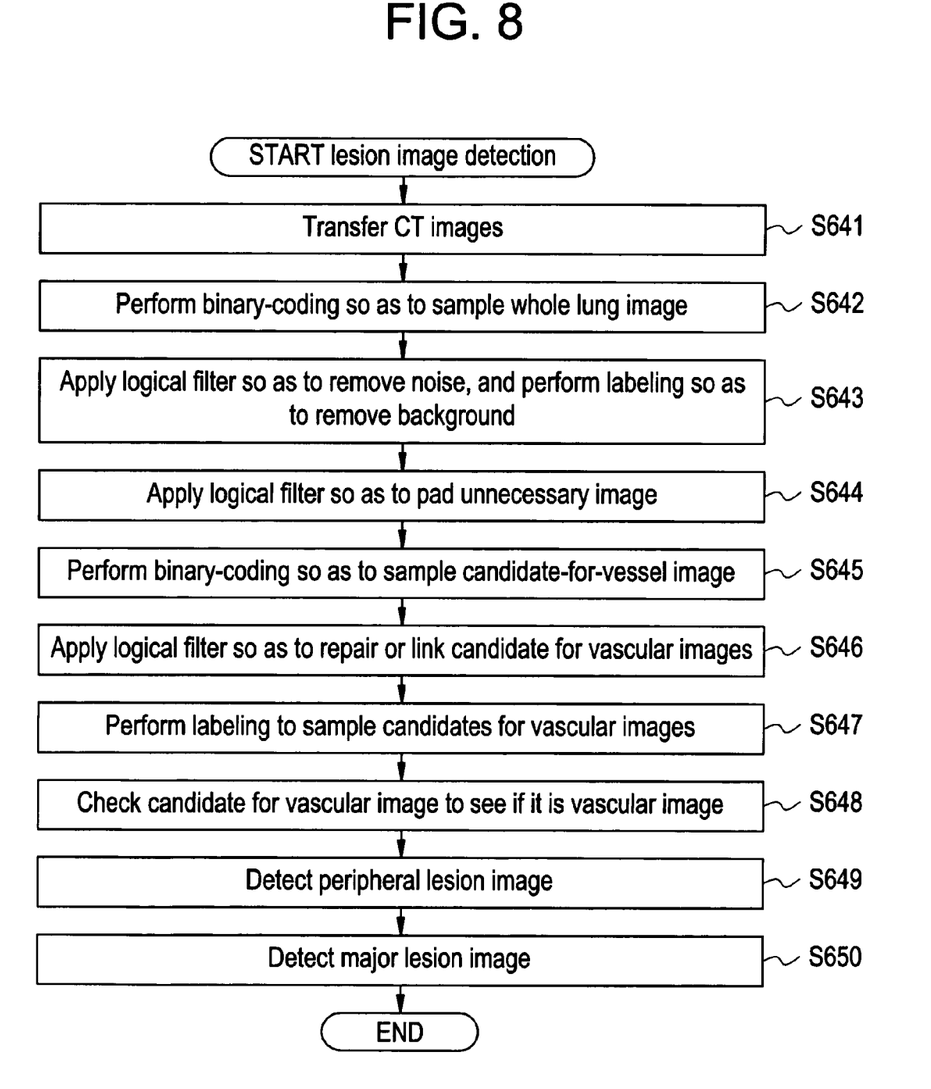
FIG. 8 is a flowchart describing lesion image detection performed in the embodiment of the present invention.

FIG. 8 is a flowchart describing the steps S64, S65, S66, and S67 in details. The flowchart describes lesion image detection to be performed in the operator console 1.

Figure 9:
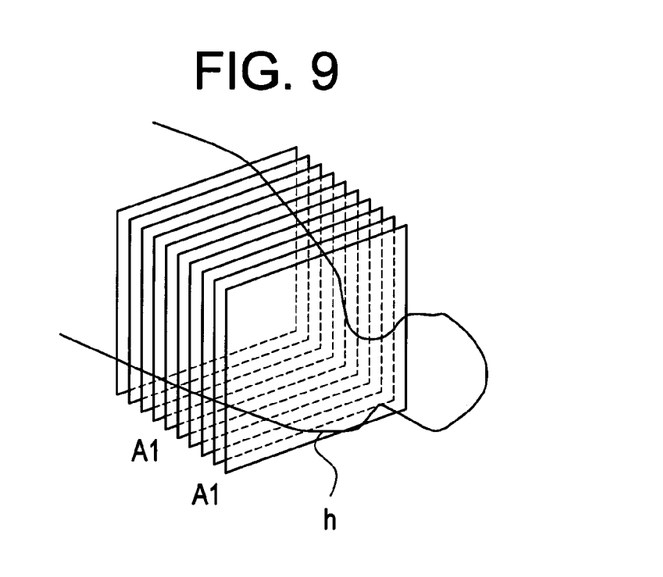
FIG. 9 shows an example of a plurality of tomographic images.

At step S641, as shown in FIG. 9, a plurality of tomographic images Si acquired by scanning a subject h at consecutive different slicing positions is transferred. When the tomographic images shown in FIG. 9 are binary-coded as they are, all of an inlet-like vascular image, a capillary image, and a candidate-for-lesion image are sampled through binary-coding. Therefore, during the processing described below, first, the inlet-like vascular image is padded with a certain value and the capillary image and the candidate-for-lesion image are sampled.

Figure 10:
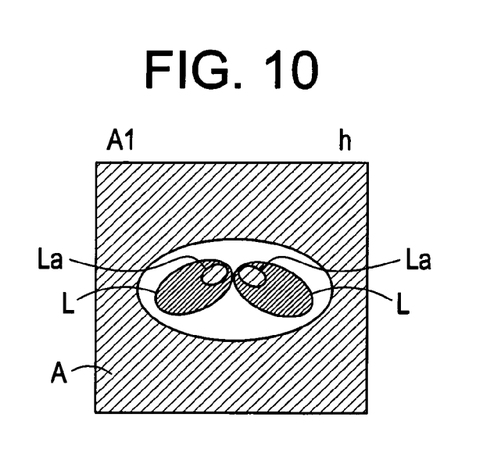
FIG. 10 is an explanatory diagram concerning binary-coding to be performed for sampling a whole lung image.

At step S642, a tomographic image is binary-coded so that CT numbers permitting sampling of a whole lung image (for example, −200 or less) will be represented with 1s and the other CT numbers will be represented with 0s. Consequently, as shown in FIG. 10, lung images L and a background (air) A are represented with 1s and the other images are represented with 0s. In FIG. 10, the images represented with 1s are hatched. Inlet-like vascular images La in FIG. 10 express thick blood vessels leading to the respective lungs L.

Figure 11:
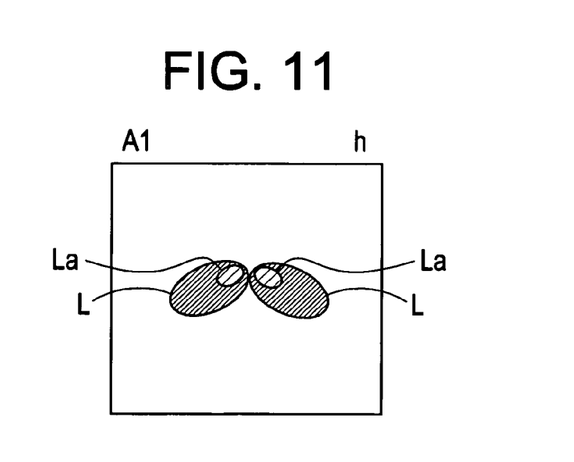
FIG. 11 is an explanatory diagram concerning processing for deleting a background.

At step S643, a three-dimensional or two-dimensional logical filter is applied to the images represented with 1s in order to contract or expand N pixels. Thus, a microscopic image observed as a noise is removed (for example, N equals 5, but the N value is varied depending on the size of one pixel). Thereafter, the images represented with 1s are three-dimensionally or two-dimensionally labeled in order to segment them. The segment estimated as the background (air) is removed. Consequently, only the lung images are the images represented with 1s. FIG. 11 shows the lung images.

Figure 12:
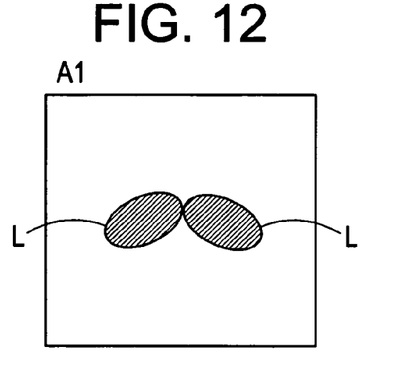
FIG. 12 is an explanatory diagram concerning processing for padding an unnecessary image.

At step S644, a three-dimensional or two-dimensional logical filter is applied to the images represented with 1s in order to enlarge and contract M pixels. Thus, the inlet-like images La that are unnecessary images are padded with 1s (for example, M equals 10, but the M value is varied depending on the size of one pixel). Consequently, as shown in FIG. 12, the inlet-like images La disappear from the lung images L.

Figure 13:
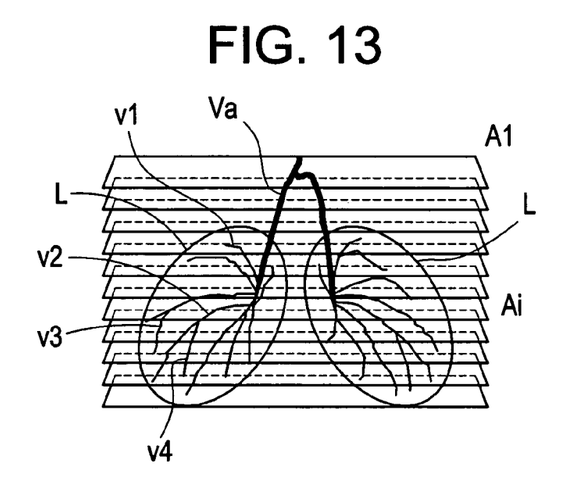
FIG. 13 is an explanatory diagram concerning a candidate-for-vessel image.

At step S645, the AND of pixels constituting the tomographic images Si is calculated in order to cut out the images padded with 1s at step S644. The cutouts (mask images) are binary-coded so that CT numbers permitting sampling of the capillary image (for example, a range from −500 to +1000 because CT numbers calculated from a contrast-enhanced vascular image range from 100 to 200, and CT numbers calculated from a vascular image whose contrast is not enhanced data items representing vessels whose visualization range from 40 to 50) will be represented with 1s and the other CT numbers will be represented with 0s. Consequently, as shown in FIG. 13, a candidate-for-vessel images Va contained in the lung images L are represented with 1s and the other portions of the lung images are represented with 0s. The candidate-for-vessel images Va contained in the lung images L are three-dimensionally modeled.

Figure 14:
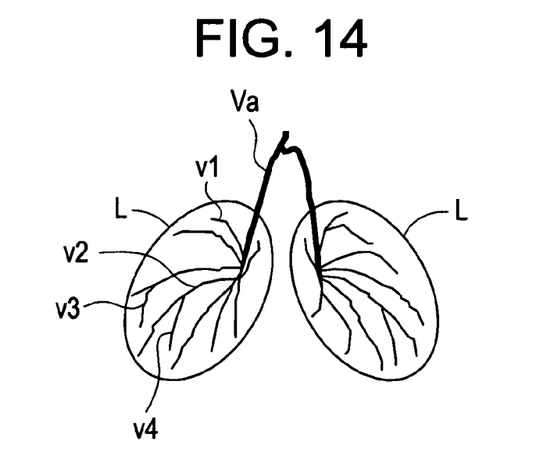
FIG. 14 is an explanatory diagram concerning linking or repair to be performed on the candidate-for-vessel image.

At step S646, a three-dimensional logical filter is applied to the candidate-of-vessel images Va in the lung images L in order to expand and contract L pixels. The candidates for vascular images v1, v2, v3, etc. whose data items are separated from one another are, as shown in FIG. 14, repaired to be linked (for example, L ranges from 1 to 3, but the L value is varied depending on the size of one pixel).

Figure 15:
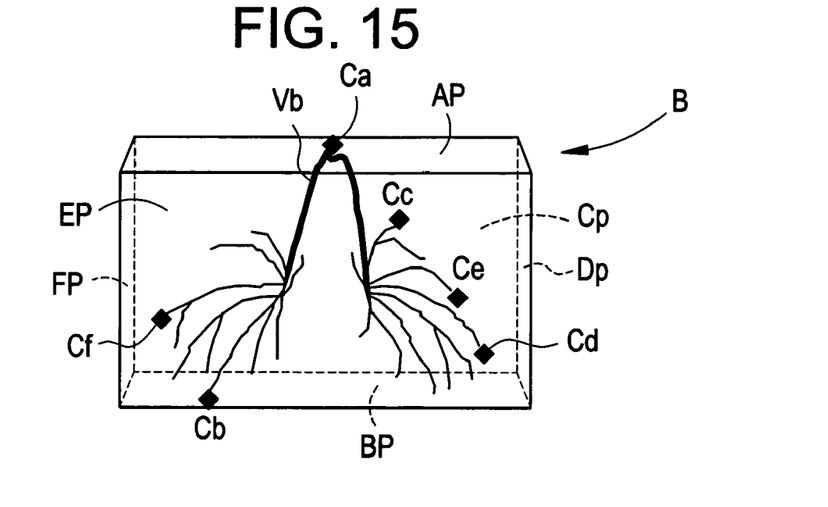
FIG. 15 is an explanatory diagram showing a rectangular parallelepiped circumscribed to candidates for vascular images.

At step S647, the candidate-for-vessel images Va are, as shown in FIG. 15, three-dimensionally labeled in order to segment the candidate-for-vessel images Va into candidates for vascular images Vb.

Figure 16:
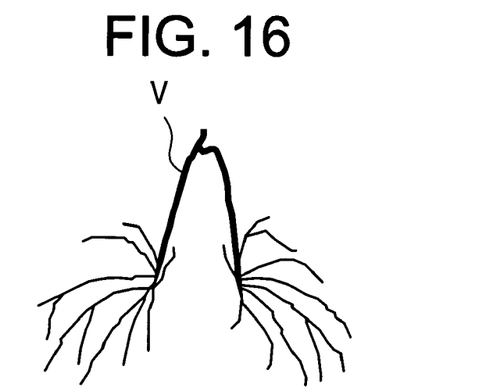
FIG. 16 is an explanatory diagram showing a sampled vascular image.

At step S648, as shown in FIG. 15, the volume of a circumscribed rectangular parallelepiped B that is defined with xmin<x<xmax, ymin<y<ymax, and zmin<z<zmax and that encloses all the voxels of the candidates for vascular images Vb is calculated. Thereafter, the candidate for a vascular image Vb having the largest volume is identified as a three-dimensional vascular image V. The other labeled three-dimensional images are removed as noises. FIG. 16 shows the three-dimensional vascular image V. In FIG. 15, the candidates for vascular images Vb are in contact with the top AP of the circumscribed rectangular parallelepiped, the bottom BP thereof, and the sides CP to FP thereof at points Ca to Cf.

Figure 17:
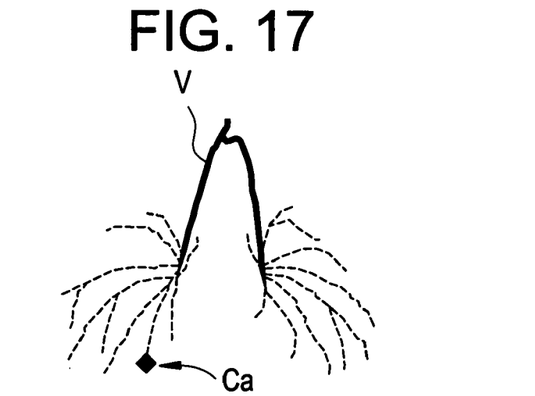
FIG. 17 is an explanatory diagram concerning a candidate-for-peripheral lesion image.

At step S649, a three-dimensional logical filter is applied to the blood vessel image V in order to contract P pixels. Consequently, the peripheral vascular images are deleted. Herein, P denotes a value calculated by adding one or two pixels to the thickness of a peripheral vascular image (for example, P ranges from 4 to 5, but the P value is varied depending on the size of one pixel). Eventually, as shown in FIG. 17, an isolated candidate-for-lesion image Ca remains at the position of the periphery of the vascular image V.

Thereafter, the sphericity $\beta$ of the candidate-for-lesion image Ca is calculated. Moreover, three-dimensional data representing the candidate-for-lesion image Ca is produced based on the candidate-for-lesion image Ca and the plurality of successive tomographic images Si, and CT numbers calculated based on the three-dimensional data is averaged. Based on the sphericity $\beta$ of the candidate-for-lesion image Ca and the average CT number, a peripheral-lesion image is detected.

Figure 18A:
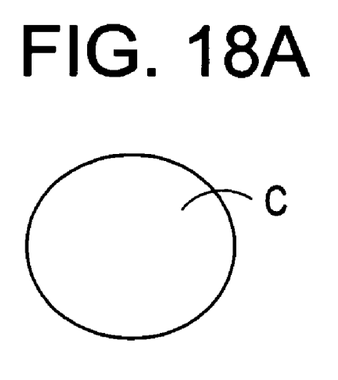
FIGS. 18a and 18b are explanatory diagrams illustrating a difference between a lesion image and a vascular image.
Figure 18B:
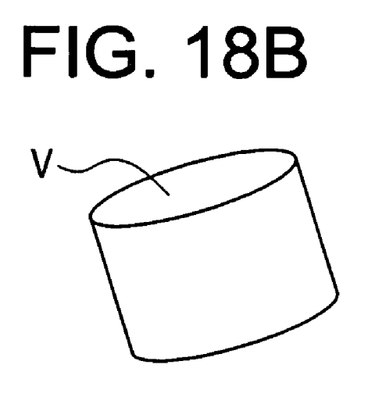

As shown in FIG. 18(a), a lesion image C is substantially spherical. As shown in FIG. 18(b), the vascular image V is substantially columnar. For example, assuming that the sphericity $\beta$ is larger than 0.8 and the average CT number ranges from 0 to +200, the candidate-for-lesion image Ca is verified to be a lesion image. Otherwise, the candidate-for-lesion image Ca is not verified to be a lesion image.

Incidentally, the sphericity $\beta$ is determined as described below.

According to a lesion image detecting method, at least the sphericity is adopted as a parameter indicating a feature of a three-dimensional image. Assuming that a superficial area is S and a volume is V, the sphericity $\beta$ or $\beta'$ is expressed as follows:

$$\beta = 6 \cdot \pi^{1/2} \cdot V/S^{3/2}$$

$$\beta' = \beta^2 = 36 \cdot \pi \cdot V^2/S^3$$

As the sphericity $\beta$ or $\beta'$ is closer to 1, the probability that the candidate-for-lesion image is a lesion image gets higher.

At step S650, a three-dimensional logical filter is applied to the vascular image V, which is left intact despite contraction performed after step S649, in order to contract Q pixels. Thus, the major vascular image is deleted. Herein, Q denotes a value calculated by subtracting P from the sum of the thickness of the major vascular image and one or two pixels (for example, Q ranges from 7 to 8 but the Q value is varied depending on the size of one pixel).

Figure 19:
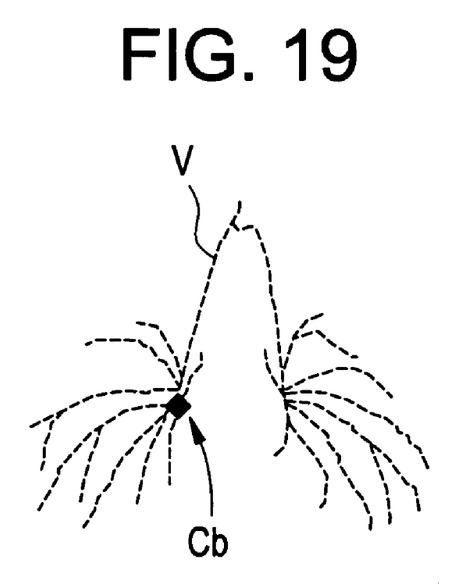
FIG. 19 is an explanatory diagram concerning a candidate-for-major lesion image.

Consequently, as shown in FIG. 19, an isolated candidate-for-lesion image Cb remains at the position of the major vascular image V. Thereafter, the sphericity $\beta$ of the candidate-for-lesion image Cb is calculated. Moreover, three-dimensional data representing the candidate-for-lesion image Cb is produced based on the candidate-for-lesion image Cb and the plurality of successive tomographic images Si. CT numbers calculated from the three-dimensional data is averaged. Based on the sphericity $\beta$ of the candidate-for-lesion image Cb and the average CT number, a major vascular lesion image is detected.

As mentioned above, while an image dedicated for CAD is reconstructed, a lesion image can be detected with high precision.

As mentioned above, the processing ending at step S645 is two-dimensional processing, and the processing starting at step S646 is three-dimensional processing. Alternatively, the whole processing starting at step S642 may be three-dimensional processing. In this case, at step S641, three-dimensional data is constructed based on the plurality of tomographic images Si.

Moreover, a threshold for use in detecting a lesion image is determined with a blood vessel image divided in terms of the thickness into a peripheral vascular image and a major vascular image. Alternatively, the blood vessel image may be divided in terms of thickness into three portions, and a lesion image may be detected in each of the three portions.

The step S646 may be omitted.

A program to be installed in a computer in order to implement the processing in accordance with the present invention in the computer, and a storage medium in which the program is stored are also implementations of the present invention. Namely, the scope of the present invention encompasses the program for implementing the processing in accordance with the present invention and the storage medium in which the program is stored so that the program will be readable by a computer.

The storage medium for use in providing the program may be, for example, a flexible disk, an optical disk (CD-ROM, CD-R, CD-RW, DVD, etc.), a magneto-optical disk, a magnetic tape, and a memory card. Methods for providing the program include a mode in which the program in accordance with the present invention is transferred as a file.

Many widely different embodiments of the invention may be configured without departing from the spirit and the scope of the present invention. It should be understood that the present invention is not limited to the specific embodiments described in the specification, except as defined in the appended claims.

The invention claimed is:

1. An X-ray CT system comprising:
   an X-ray generation device;
   an X-ray detection device opposed to the X-ray generation device with a subject between them; and
   an image reconstruction device for reconstructing a tomographic image of the subject based on a plurality of views of projection data items acquired via the X-ray detection device, wherein said image reconstruction device performs image reconstruction dedicated to a computer-aided detection (CAD) mode; and
   an extraction device comprising a filter and configured to obtain a parameter indicating a feature of a first set of regions in the subject, and extract, based on the parameter, a specific region from the first set, said filter configured to reduce noise by applying at least one of an N-pixel contraction and an N-pixel expansion processing to the first set of regions.

2. The X-ray CT system according to claim 1, wherein the image reconstruction device comprises a reconstruction function dedicated to the computer-aided detection mode.

3. The X-ray CT system according to claim 1, wherein the image reconstruction device is configured to remove noise from the projection data items by preprocessing the projection data items during the computer-aided detector mode.

4. The X-ray CT system according to claim 1, wherein the image reconstruction device is configured to post-process by applying a noise removal filter dedicated to the computer-aided detection mode.

5. The X-ray CT system according to claim 1, wherein the image reconstruction device comprises a user interface dedicated to the computer-aided detection mode.

6. The X-ray CT system according to claim 5, wherein the user interface permits selection of a reconstruction function dedicated to the computer-aided detection mode.

7. The X-ray CT system according to claim 5, wherein the user interface permits selection of post-processing that includes a noise removal filter dedicated to the computer-aided detection mode.

8. The X-ray CT system according to claim 5, wherein the user interface permits selection of preprocessing to remove noise from the projection data items during the computer-aided detector mode.

9. The X-ray CT system according to claim 1 further comprising a filter configured to delineate the regions within the first set.

10. The X-ray CT system according to claim 1, wherein said extraction device is configured to apply labeling processing to a second set of regions of the subject to segment at least one of the regions within the second set, wherein said extraction device configured to remove a third set of regions that are not the specific region from the second set of regions.

11. The X-ray CT system according to claim 1, wherein said filter is configured to reduce noise by removing a microscopic region from the regions within the first set, and is configured to remove the microscopic region by applying at least one of the N-pixel contraction and the N-pixel expansion processing to the first set of regions.

12. The X-ray CT system according to claim 1, wherein said filter is configured to configured to reduce noise by applying the N-pixel contraction and the N-pixel expansion processing to the first set of regions.

* * * * *